United States Patent Office 2,839,596
Patented June 17, 1958

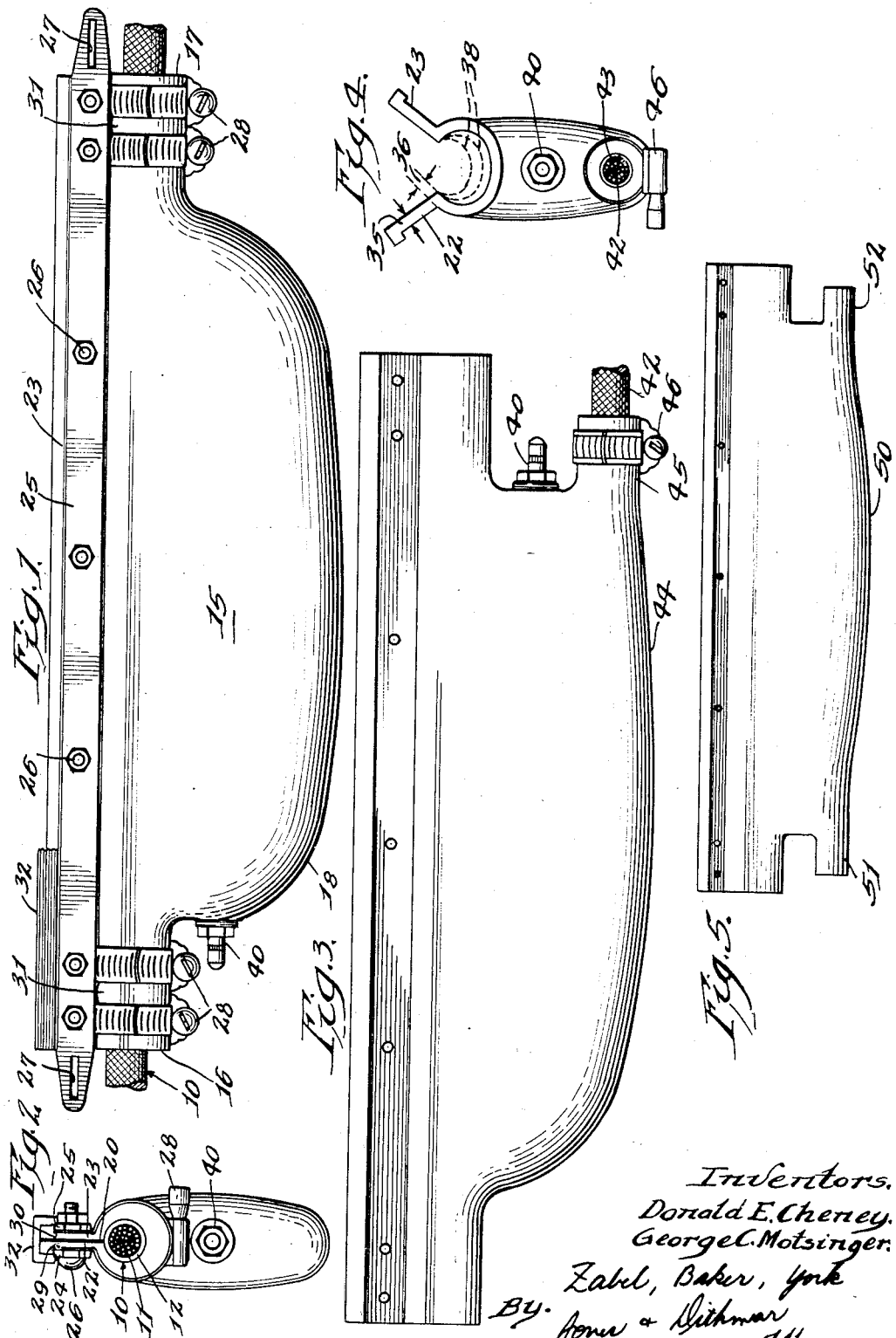

2,839,596

SPLICE SLEEVE

Donald E. Cheney, Lombard, and George C. Motsinger, Chicago, Ill., assignors to Reliable Electric Company, Chicago, Ill., a corporation of Illinois Application July 22, 1955, Serial No. 523,714

3 Claims. (Cl. 174—92)

This invention relates to a splice sleeve, and more particularly to a weatherproof splice sleeve which is flexible (non-rigid) in character.

A splice sleeve is a device which encloses that portion of a communication cable or the like which contains one or more splices in the individual conductors making up the cable. A cable splice may comprise splices only between individual conductors of the cable, or they may include splices between individual conductors of a main or line cable and those of an associated tap, stub, or branch cable.

Whenever a splice of any type is made in a cable it is necessary thereafter to enclose the spliced portion of the cable in a weatherproof housing. Heretofore such housings mainly have been metal members which require complicated clamps, sealing compounds, wipe joints, etc. in order to establish the required sealed relationship with the cable. Some prior housings are of such character that the cable must be cut completely in two in order to apply them.

Communication cables often have an exterior jacket or sheath of lead or other suitable metal. Due to the inherent difficulty of establishing a good seal with the metal exterior of such cables, prior splice enclosures or sleeves are expensive, complicated devices which require considerable skill to install properly.

Recently many communication cables utilize a jacket or sheath of polyethylene or like plastic material. The splice sleeve of this invention is particularly suited to use with plastic covered cables, although it may be used with metal covered cables as well.

One object of the invention is to provide a splice sleeve which is flexible (non-rigid) in character to facilitate handling and installation.

Another object of the invention is to provide a splice sleeve of a particular size which effectively may be used on cables of more than one outer-diameter size. Specifically, a splice sleeve of the invention can be applied to cables which vary in diameter at least a quarter of an inch, or more.

Another object of the invention is to provide a splice sleeve which can be manufactured at low cost compared with prior sleeves and which will have a useful life as long as that of the cable it is used on.

Still another object is to provide a splice sleeve which can be applied to a cable by even an unskilled workman. Sealing is readily accomplished without the use of sealing compounds, wipe joints, etc.

Another object is to provide a splice sleeve having a comparatively small number of component parts.

Another object is to provide a splice sleeve which may be applied without cutting the cable in two.

Still another object is to provide a splice sleeve wherein the portions of the sleeve which are sealed to the cable expand and contract in response to temperature and pressure conditions and continue to maintain the seal.

Briefly described, a splice sleeve embodying the invention comprises a generally tubular member of flexible, resilient material. The interior cross sectional size of the member between its end portions is somewhat larger than that of the end portions to accommodate the spliced portion of a cable. The tubular member has a longitudinal slit through which a continuous length of cable, including the spliced portion, is admitted to the interior of the member. Thus it is unnecessary to cut the cable in two to apply the sleeve.

A pair of longitudinal flanges extend one from each slit edge, and means are provided to force these flanges together to establish a seal along the slit. The end portions of the member have an inner diameter corresponding generally with the outer diameter of the cable, and means are provided to clamp the end portions of the member in a sealing manner to the cable.

Other objects, advantages and details of the invention will be apparent as the description proceeds, reference being had to the accompanying drawing wherein several forms of the invention are shown. It is to be understood that the description and drawing are illustrative only and the scope of the invention is to be measured by the appended claims.

In the drawing:

Fig. 1 is a side elevational view of one form of splice sleeve embodying the invention, the splice sleeve being of the type applied to a straight or repair splice involving a single cable and shown applied to a cable;

Fig. 2 is an end elevational view of the assembly shown in Fig. 1;

Fig. 3 is a side elevational view of a modified splice sleeve embodying the invention, the sleeve being of the type to enclose the splice required by a single tap cable, certain parts of the sleeve being omitted for clarity;

Fig. 4 is an end elevational view of the sleeve shown in Fig. 3, the sleeve being shown in opened out condition, and Fig. 5 is a side elevational view of another modified form of splice sleeve embodying the invention, the sleeve being of the type to enclose the splice required by two tap cables, certain parts of the sleeve being omitted for clarity.

Referring now to the drawing, and particularly to Figs. 1 and 2 thereof, a splice sleeve embodying the invention is shown applied to a spliced cable 10. As best shown in Fig. 2, cable 10 includes a plurality of individual conductors 11 and an exterior jacket or sheath 12. In many present day cables, jacket 12 is of plastic material, as previously mentioned.

The splice sleeve includes a generally tubular member 15 of flexible, resilient material. Examples of suitable material for member 15 are high grade neoprene which is flexible at minus 40 degrees F. and durable at 300–400 degrees F., polyvinyl chloride and other plastic compounds. Materials of this character have age characteristics comparable to those of the cable jackets.

Member 15 has end portions 16 and 17 of inner diameter corresponding generally with the outer diameter of associated cable 10. Portion 18 of member 15 between end portions 16 and 17 has an interior cross sectional size which is somewhat larger than that of the end portions, this increased size being necessary to accommodate the extra bulk in the cable imposed by the splice.

Referring again to Fig. 2, member 15 has a longitudinal slit 20 extending from one end to the other. Slit 20, of course, has its edges spread apart to admit a continuous length of cable to the interior of the member. The resilience of the material in member 15 is such that the shape of the member is restored after a cable is admitted, and the member is self-supporting even before application of certain clamps which form part of the sleeve and will be described later.

Member 15 has a pair of longitudinal flanges 22 and 23 extending one from each slit edge as best shown in Fig. 2. Flanges 22 and 23 are adapted to be forced together to seal slit 20, as will be seen.

Means are provided to force flanges 22 and 23 together, and in the forms of the invention shown, such means comprise clamping bars 24 and 25 and spaced bolts 26, all of non-corrosive material. As shown, clamping bars 24 and 25 respectively engage the exterior faces of flanges 22 and 23, and bolts 26 pass through aligned apertures in the bars and flanges. Preferably the head ends of bolts 26 are permanently associated with or splined to bar 24 to avoid loose parts in the field. In some instances it may be desirable to mold flanges 22 and 23 directly to the bars 24 and 25, but with such an arrangement, a certain amount of flexibility is lost. Therefore, at present it is considered preferable to have the clamping bars separate from the flanges.

In some forms of the invention clamping bars 24 and 25 extend somewhat beyond the ends of member 15, as best shown in Fig. 1. Slots 27 are provided in the ends of the bars to receive straps (not shown) to support the sleeve from a messenger.

Means also are provided to seal end portions 16 and 17 of member 15 to cable 10. In the form of the invention shown hose type clamps 28 are used for this purpose. Hose clamps 28, of non-corrosive material, preferably are of the split type, i. e. that is, the band of the clamp is split in two so that the band may be spread and fitted over an end portion 16 or 17. Thus, each band has free ends 29 and 30 which respectively are fixed to clamping bars 24 and 25 by means of bolt 26 (Fig. 2).

As shown in Fig. 1, a pair of clamps 28 preferably is used at each end portion of member 15. The two clamps are spaced a short distance from each other, and when tightened in place, a bulge of the flexible resilient material 31 develops in the region between the two clamps. This bulge constitutes an energy reservoir in the resilient material to compensate for expansion and contraction which occurs in response to changes in temperature and pressure.

To prevent the entry of dirt, moisture etc. into the exterior juncture of flanges 22 and 23, a cap means 32 (Fig. 2) may be provided to overlie the juncture. Cap means 32 as shown is an elongated member with a U-shaped cross section which embraces the portions of the flanges which protrude beyond clamping bars 24 and 25. Alternatively, cap means 32 may be integral with one of the flanges and extend over the other flange to provide the desired seal.

Referring to Fig. 4, it has been found that most effective sealing by flanges 22 and 23 occurs when a predetermined ratio (about 1:1) is maintained between the thickness 35 of a flange and the thickness 36 of the wall of member 15 which is immediately adjacent the flange. Thus, it is desirable to maintain this ratio constant regardless of the size of the sleeve which, of course, varies depending on the sizes of cables for which the sleeve is designed.

The same flange thickness 35 and the same adjacent wall thickness 36 preferably are used throughout a family of sleeves of different sizes. By so doing, it is possible to utilize the same basic mold for each sleeve size in the family, the dash lines 38 in Fig. 4 illustrating the simple change to be made in the mold size in order to maintain these dimensions. In other words, while the inner diameter of end portions 16 and 17 must be varied in order to fit various ranges of cable size, the diameter variation is not made with reference to a common center, but rather to a common tangent, i. e., the tangent at slit 20.

Tubular member 15 may be provided with a valve 40 to admit compressed gas for testing purposes. After the sleeve is installed, gas under pressure of 1-3 pounds per square inch is directed through valve 40 and a soap solution or equivalent is applied to the exterior of the sleeve. Any leaks will be apparent, and they can be sealed by further tightening of the hose clamps or clamping bars.

Figs. 3 and 5 merely illustrate additional types of splice sleeves, the sleeves, of course, embodying the present invention.

Fig. 3 shows a splice sleeve for use with a main cable and a singel tap cable. The sleeve is constructed and associated with the main cable as described above, and a tap cable 42 enters the sleeve through an aperture 43 (Fig. 4). Center portion 44 of the sleeve has an extension 45, and aperture 43 extends through the extension. A suitable clamp means such as hose clamp 46 embraces extension 45 and establishes a seal between tap cable 42 and extension 45.

The splice sleeve shown in Fig. 5 is basically the same as that shown in Fig. 3 except that it is designed to accommodate two tap cables. Thus, member 50 has two extensions 51 and 52 which are apertured to receive tap cables (not shown).

From the above description it is thought that the construction and advantages of our invention will be readily apparent to those skilled in the art. Various changes in detail may be made without departing from the spirit or losing the advantages of the invention.

Having thus described our invention, what we claim as new and desire to secure by Letters Patent is:

1. A weatherproof sleeve to enclose a cable splice comprising a generally tubular member of resilient material, the interior cross sectional size of said member between the end portions thereof being larger than that of the end portions, said member having a longitudinal slit to admit a continuous length of cable to the interior of the member, a pair of longitudinal flanges extending one from each slit edge and adapted to be forced together to seal said slit, a pair of clamping bars associated with said flanges, means for forcing said clamping bars together to clamp said flanges therebetween, and a pair of spaced hose clamps on each end portion of said member to provide a seal between said end portions and the enclosed cable, said hose clamps being of the split type with the free ends thereof affixed to said clamping bars.

2. A weatherproof sleeve to enclose a cable splice comprising a generally tubular member of resilient material, the interior cross sectional size of said member between the end portions thereof being larger than that of the end portions, said member having a longitudinal slit to admit a continuous length of cable to the interior of the member, a pair of longitudinal flanges extending one from each slit edge and adapted to be forced together to seal said slit, means for forcing said flanges together, and at least one hose clamp on each end portion of said member to provide a seal between said end portions and the enclosed cable, said hose clamps being of the split type with the free ends thereof affixed to said means for forcing said flanges together.

3. A weatherproof sleeve to enclose a cable splice comprising a generally tubular member of resilient material, the interior cross sectional size of said member between the end portions thereof being larger than that of the end portions, said member having a longitudinal slit to admit a continuous length of cable to the interior of the member, a pair of longitudinal flanges extending one from each slit edge and adapted to be forced together to seal said slit, means for forcing said flanges together, and at least one hose clamp on each end portion of said member to provide a seal between said end portions and the enclosed cable.

References Cited in the file of this patent

UNITED STATES PATENTS

| | | |
|---|---|---|
| 1,180,729 | Marshall | Apr. 25, 1916 |
| 1,977,774 | Osborne | Oct. 23, 1934 |
| 1,996,565 | Boeh et al. | Apr. 2, 1935 |